(12) United States Patent
Amin et al.

(10) Patent No.: US 11,513,668 B2
(45) Date of Patent: Nov. 29, 2022

(54) EXTENSIBLE USER EXPERIENCE FRAMEWORK

(71) Applicant: Zoom Video Communications, Inc., San Jose, CA (US)

(72) Inventors: Omar Amin, San Jose, CA (US); Yang He, Hangzhou (CN); Saravanakumar Venkatasubramanian Tiruthani, Cupertino, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/243,202

(22) Filed: Apr. 28, 2021

(65) Prior Publication Data

US 2022/0350466 A1  Nov. 3, 2022

(51) Int. Cl.
  *G06F 3/048* (2013.01)
  *G06F 3/04842* (2022.01)
  *G06F 3/0481* (2022.01)

(52) U.S. Cl.
  CPC ........ *G06F 3/04842* (2013.01); *G06F 3/0481* (2013.01)

(58) Field of Classification Search
  None
  See application file for complete search history.

(56) References Cited

U.S. PATENT DOCUMENTS

| | | | |
|---|---|---|---|
| 8,412,845 B2 * | 4/2013 | Katis | H04L 65/1083 709/234 |
| 8,891,737 B2 | 11/2014 | Vendrow et al. | |
| 9,270,630 B1 * | 2/2016 | Eidelson | H04L 51/36 |
| 9,516,115 B2 | 12/2016 | Chang | |
| 9,800,620 B2 | 10/2017 | Govindankutty et al. | |
| 2008/0250475 A1 | 10/2008 | Tam et al. | |
| 2010/0111072 A1 | 5/2010 | Hyun | |
| 2018/0143963 A1 * | 5/2018 | Jindal | G06F 40/205 |

OTHER PUBLICATIONS

UniVoIP, Receptionist IP Console, https://univoip.com/products/secure-softphones-and-apps/receptionist-ip-console/, 4 pages, retrieved Apr. 28, 2021.
Softphone.Pro, VoIP Softphone for Business, https://softphone.pro/, 8 pages, Feb. 25, 2021.

* cited by examiner

*Primary Examiner* — Thanh T Vu
(74) *Attorney, Agent, or Firm* — Young Basile Hanlon & MacFarlane, P.C.

(57) ABSTRACT

An extensible user experience framework includes outputting a graphical user interface (GUI) including a persistent panel for displaying alerts of real-time communications and presenting single-click options for users to select to initiate actions in response to those alerts. A GUI is output for display at a client device. The GUI presents one or more alerts and one or more response actions for each of the one or more alerts, in which each of the alerts corresponds to different real-time communications received at the client device, and the response actions for a given alert are each selectable by a single user interaction to initiate a different action for a real-time communication associated with the given alert. An action for the real-time communication associated with the given alert is later initiated responsive to a selection of a response action for the given alert.

20 Claims, 9 Drawing Sheets

EXTENSIBLE USER EXPERIENCE FRAMEWORK

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for an extensible user experience framework.

One aspect of this disclosure is an apparatus. The apparatus includes a memory and a processor configured to execute instructions stored in the memory to output a graphical user interface (GUI) for display at a client device and to initiate an action for a real-time communication associated with a given alert responsive to a selection of a response action of one or more response actions for the given alert. The GUI presents one or more alerts and one or more response actions for each of the one or more alerts, in which each of the one or more alerts corresponds to different real-time communications received at the client device and the one or more response actions for a given alert are each selectable by a single user interaction to initiate a different action for a real-time communication associated with the given alert.

Another aspect of this disclosure is a non-transitory computer readable storage device. The non-transitory computer readable storage device includes program instructions that, when executed by a processor of a client device, cause the processor to perform operations including configuring response actions for one or more types of alerts within a GUI using input received from the client device, outputting the GUI for display at the client device in which the GUI presents one or more alerts and one or more of the response actions based on types of the one or more alerts, and initiating an action for a real-time communication associated with an alert of the one or more alerts responsive to a selection of a response action of the response actions for the alert.

Yet another aspect of this disclosure is a system. The system includes a first communication system, a second communication system, and a GUI system. The first communication system is configured to implement a first service through which first real-time communications are received at a client device. The second communication system is configured to implement a second service through which second real-time communications are received at the client device. The GUI system is configured to output a GUI for display at the client device in which the GUI presents one or more alerts and one or more response actions for each of the one or more alerts and each of the one or more alerts corresponds to one of the first real-time communications or one of the second real-time communications. An action associated with the first service is initiated responsive to a selection of a response action associated with an alert corresponding to one of the first real-time communications and an action associated with the second service is initiated responsive to a selection of a response action associated with an alert corresponding to one of the second real-time communications.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
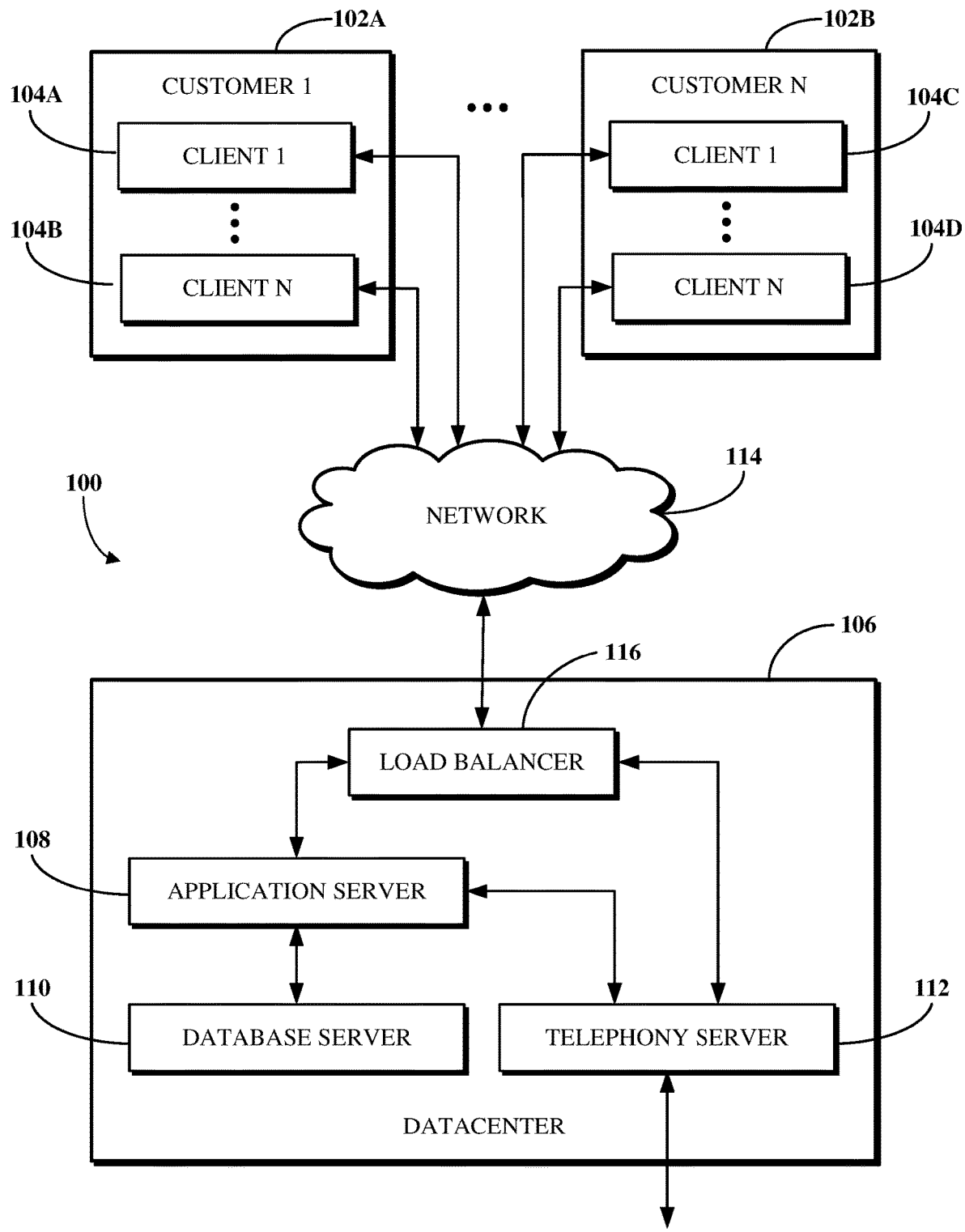
FIG. 1 is a block diagram of an example of an electronic computing and communications system.

With real-time communications, such as incoming calls, instant messages, chat messages, or the like, people typically have to deal with lots of information in a very short period of time. For example, when a call is incoming and the phone is ringing, a person has maybe ten to fifteen seconds to answer the call before it is no longer available. Furthermore, a real-time communication always has some context. For example, the context of a real-time communication may refer to a salesperson attempting to persuade a prospective customer to purchase a product or service. In another example, the context of a real-time communication may refer to a medical doctor seeking to review laboratory results with a patient.

In a UCaaS platform which includes telephony services, conferencing services, messaging services, and the like, real-time communications may arise over one or more modalities for various platform users. The frequency may, for example, be based on a particular platform user's role within an office which uses the UCaaS platform. For example, a receptionist or executive assistant may receive incoming calls throughout the entire business day and have little time to action those calls, such as by answering them, forwarding them to other platform users, or causing some response to occur. In particular, so-called power users, which generally refer to anyone who uses the services of the UCaaS platform frequently throughout a workday, may rely upon support from the UCaaS platform to help them identify and action real-time communications in an efficient manner.

One approach includes using on-screen softphones and other soft applications dedicated for specific purposes which can present notifications on the user's display upon some event occurring. However, this approach is insufficient because it typically includes high levels of detail for a given dedicated service or application such that it cannot integrate multiple applications or services together. Thus, a user must still navigate through multiple windows (e.g., software application windows, web browser tabs, etc.) to locate various types of applications or services for actioning. In many cases, by the time the user finds the correct window, there may not be sufficient time remaining to take action on a given real-time communication.

Furthermore, existing on-screen softphones and other existing soft applications are not extensible to support third party services which may also be used by a given UCaaS platform user. Often times, real-time communications may involve third party software (e.g., an x-ray imaging software, software which is being demonstrated for a potential sale, etc.). It is thus very important that a UCaaS platform provide a mechanism to support immediate real-time communication exchanges in one or more modalities for both first party and third party applications. Given that so many modalities are implemented in the software space, there is limited room available on a user's display for an additional software application. However, given that real-time communications typically require immediate actioning, it is very important that users have immediate access at all times to something which enables them to both receive a communication quickly and respond to it quickly.

Implementations of this disclosure address problems such as these using an extensible user experience framework which includes outputting a GUI including a persistent panel for displaying alerts of real-time communications and presenting single-click options for users to select to initiate actions in response to those alerts. The persistent panel is an extensible persistent panel which sits on a user's display to make the user aware of real-time communications in one or more modalities and to enable the user to take some action in response to a real-time communication in a single click regardless of the modality. The persistent panel generally occupies less display space than a typical software application, and, in some cases, the size may be configurable based on user preferences and/or based on a number of applications integrated within the persistent panel. The persistent panel is persistent such that it remains on top of the user's display for immediate viewing at all times, unless otherwise configured. The persistent panel is extensible such that it can be used for current and future first or third party applications or services provided those applications or services indicate some type of information and some manner of allowing a user to interact therewith. The purpose of the persistent panel is thus to make the user aware of some kind of communication and provide the user with one or more single-click, configurable actions to perform in response thereto.

To describe some implementations in greater detail, reference is first made to examples of hardware and software structures used to implement an extensible user experience framework. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
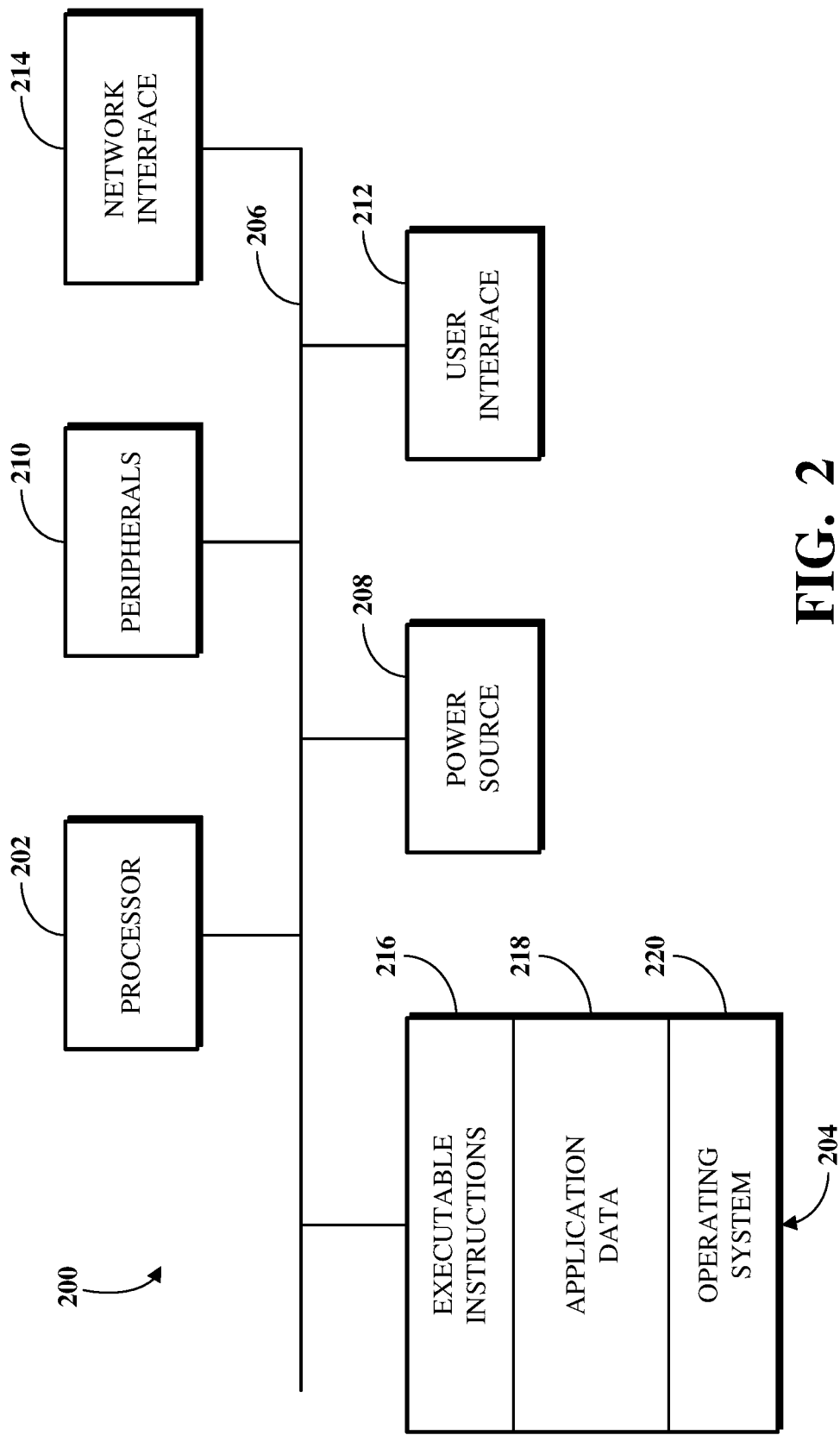
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
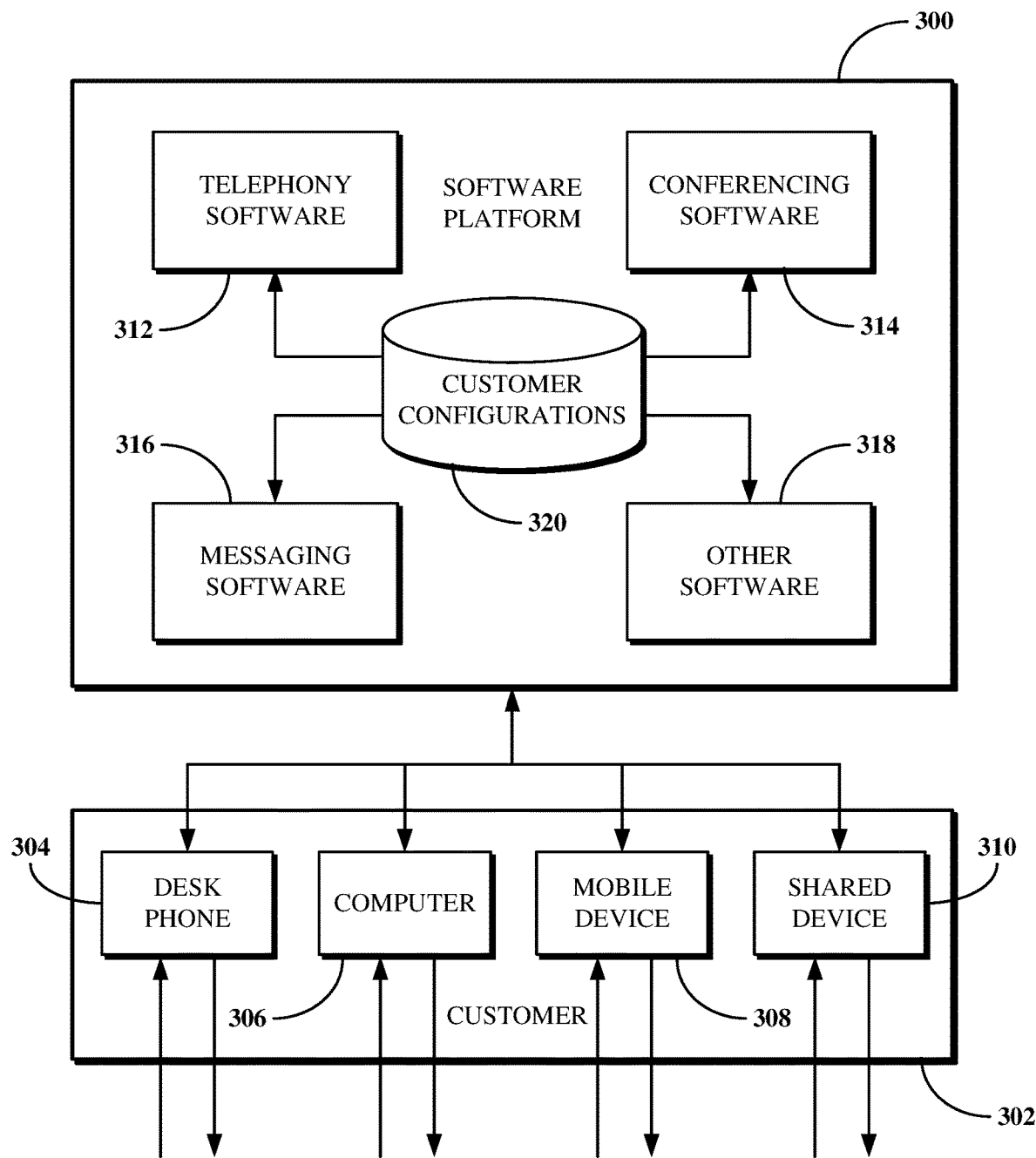
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for configuring, outputting, and otherwise using a GUI which displays alerts associated with real-time communications and response actions selectable to initiate actions for the real-time communications.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304-310.

Figure 4:
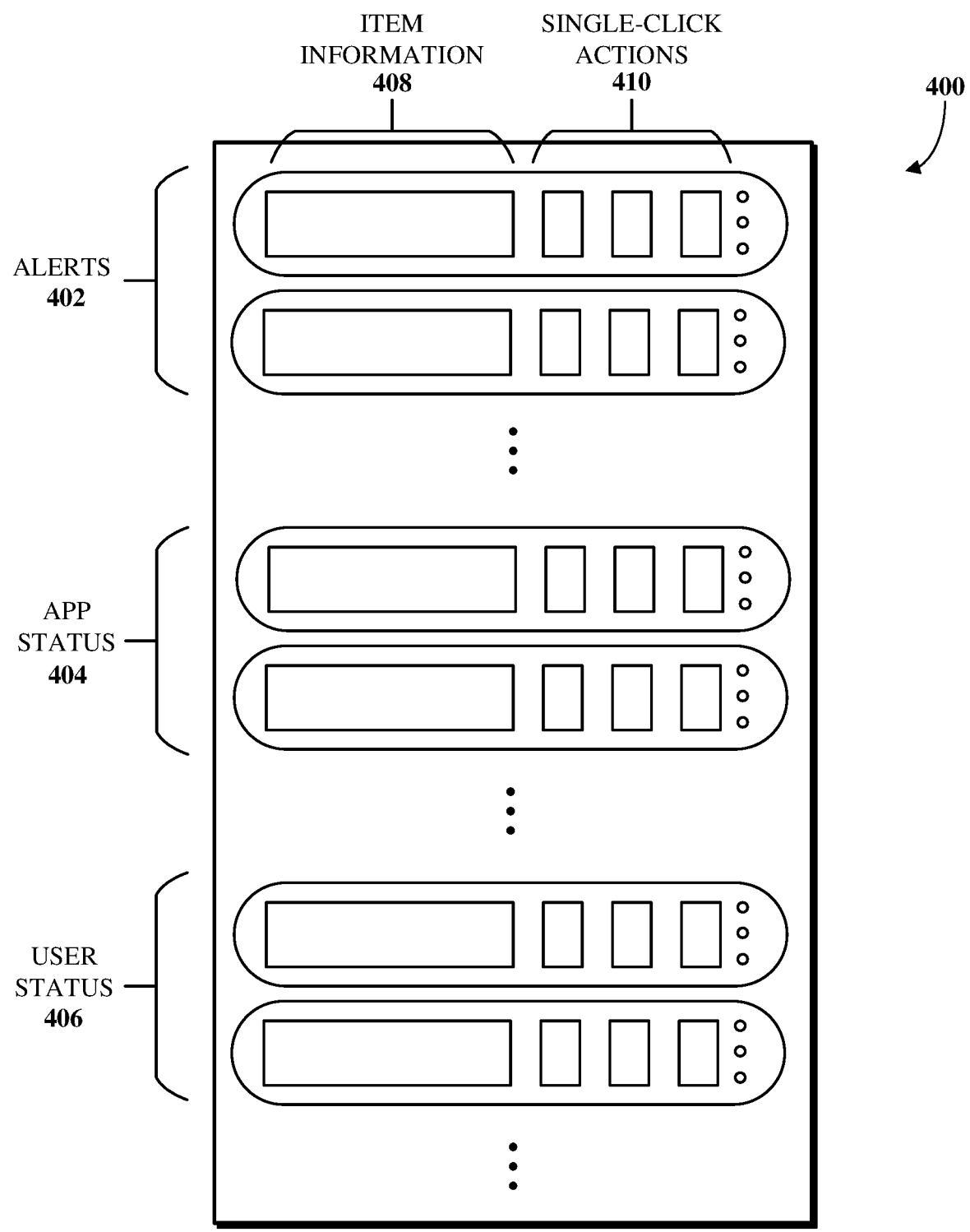
FIG. 4 is an illustration of an example of a persistent panel which may be represented within a GUI of a software platform.

FIG. 4 is an illustration of an example of a persistent panel 400 which may be represented within a GUI of a software platform, for example, the software platform 300 shown in FIG. 3. The persistent panel 400 represents some or all of a GUI and is used for displaying alerts of real-time communications and presenting single-click options for users to select to initiate actions in response to those alerts. For example, the persistent panel 400 may be configured, initialized, or otherwise used within a GUI generated, output, or otherwise processed using the other software 318 shown in FIG. 3.

The persistent panel 400 includes groupings of information output in the GUI. As shown, the persistent panel 400 includes an alerts grouping 402, an application status grouping 404, and a user status grouping 406. Each grouping can have one or more entries, represented as unique rows within the persistent panel 400. In FIG. 4, two entries are shown for each grouping; however, each grouping may have more or fewer entries in the persistent panel 400. In particular, the groupings may have different numbers of entries at different times such as based on various communication events, changes in application statuses, and changes user status. The persistent panel 400 may have a fixed size. Alternatively, the size of the persistent panel 400 may scale based on the number of entries therein.

The alerts grouping 402 includes entries corresponding to real-time communications over one or more modalities. For telephony-related communications, one entry in the alerts grouping 402 may be for a new incoming call, another may be for a call already in-process and placed on hold, another may be for a missed call or voicemail message, etc. For conference-related communications, one entry in the alerts grouping 402 may be for a meeting reminder that pops up immediately before or after a conference begins, another may be for a conference which was rescheduled, etc. In one example, a user may be lost in an email and not aware that someone else has started a meeting they are late for. The entry representing an alert for that meeting in the alerts grouping 402 can flash or otherwise indicate that the meeting has started to catch the user's attention.

The application status grouping 404 includes entries corresponding to application status indicators for one or more first party or third party software applications or services, in which first party software applications or services are native to the software platform and third party software applications or services are external to the software platform. For customer service agents using a service software, one entry in the application status grouping 404 may be for a call queue status, another may be for a call queue member status, another may be for an executive status, another may be an employee channel, etc. The application status grouping 404 can include fixed or static information for various first party and/or third party software applications or services. In one example, a user may click on an entry in the application status grouping 404 corresponding to a social communication channel which allows other users logged into it to communicate with him or her.

The user status grouping 406 includes entries corresponding to the status of the user himself or herself. For example, one entry in the user status grouping 406 may be a presence indicator (e.g., online, away, in-meeting, do not disturb, etc.), another may be for an audio control menu such as to enable or disable various audio peripherals usable for participating in a real-time communication (e.g., a wireless headset, microphones, or the like), another may be for a keypad, etc. For example, a user may interact with an entry in the user status grouping 406 to initiate a break process (e.g., to visit the restroom, to take a lunch break, etc.).

Regardless of the grouping, each entry in the persistent panel 400 includes an item information aspect 408 and one or more single-click actions 410. The item information aspect 408 displays information associated with the entry. For example, an item information aspect 408 for an entry within the alerts grouping 402 associated with an incoming call can display text indicating that a call is incoming and information associated with the call, such as a telephone number of the caller, a name of the caller, or other information. In another example, an item information aspect 408 for an entry within the application status grouping 404 associated with a team chat channel can display a name and availability of that team chat channel. In yet another example, an item information aspect 408 for an entry within the user status grouping 406 associated with a social presence of the user can display information indicating whether the user is available, busy, in a meeting, in a "do not disturb" mode, or otherwise unavailable.

The single-click actions 410 are interactive user interface elements within the GUI corresponding to response actions that, when selected by a user, cause some action to occur in connection with the subject of a given entry. A single-click action 410 may thus be selected by a single user interaction to initiate some action associated with the subject of the respective entry. For example, for an entry within the alerts grouping 402 representing an incoming call, the single-click actions may correspond to response actions including to accept the call, decline the call, and transfer the call. In another example, for an entry within the application status grouping 404 representing a conference, the single-click actions may correspond to response actions including to join the conference, leave the conference, and message participants of the conference. In yet another example, for another entry within the application status grouping 404 representing a call queue, the single-click actions may correspond to response actions including to check queue status and check queue total. For example, where the persistent panel 400 is output to a display of a client device, such as a desktop computer or a laptop computer, a single user interaction with a single-click action may be a single click using a mouse or other peripheral of the desktop computer or of the laptop computer.

Each entry within any of the groupings 402 through 406 includes one or more single-click actions 410. Although three single-click actions 410 are shown in FIG. 4 for each of the entries, some entries may include more or fewer action options. The single-click actions 410 may be initially set by default such as to enable a set of most frequently used actions to be taken in response to a single user click for a given entry. In some implementations, the single-click actions 410 associated with a given entry may be configurable.

In some implementations, the persistent panel 400 can include one or more other groupings in addition to or instead of one or more of the groupings 402 though 406. For example, the persistent panel 400 may include a grouping of entries directed to analytics software or services. For example, an analytics entry may report information about user operations, customer service agent operations, and the like. In one example, a customer service agent may have visibility into how many other agents on his or her team are on calls at a given time, the average length of time for a call, etc. In some cases, the action items associated with such entries may include actions to review certain reports, send reports to other users, etc. In other cases, there may not be any action items associated with these, as they may be for reporting purposes only.

In some implementations, the entries for one or more of the groupings 402 through 406 may be generated using a machine learning model or other intelligence aspect that monitors information associated with the software platform, communication services, application information, user information, or the like in real-time to suggest items for the user. For example, a real-time transcription process can translate spoken communications to text, or text can be retrieved from a chat message or other conversation, and an intelligence aspect may process that text for keyword and context usage to determine that a specific topic is being discussed. A new entry may then be introduced within the persistent panel with single-click actions to view a knowledgebase article for the topic, message participants about the topic, conduct an internet search for the topic, or the like.

In some implementations, entries within the persistent panel may be color coded. In one example, colors may be static such as to visually distinguish between entries of the different groupings 402 through 406. In another example, the color for a given entry may change based on some condition. For example, where an entry corresponds to a call that is placed on-hold, the entry may start green and then gradually change in a gradient from green to yellow to red based on some length of time that the caller is waiting on-hold.

In some implementations, the alerts may include entries which are pushed from a manager, supervisor, team member, etc. for immediate actioning by multiple users. One example is a voting option where the alert indicates a matter to be voted on and the single-click actions are the options available for voting.

In some implementations, the single-click actions 410 presented within the persistent panel for selection by the user for a given entry type may be configured. For example, a user may click on the three dots next to the single-click actions 410 for a given entry to map a number of possible action responses for entries of that type to the single-click actions 410. In some such implementations, configuring the single-click actions 410 for a given entry may include changing a number of single-click actions 410 which are available for entries of that type.

Figure 5:
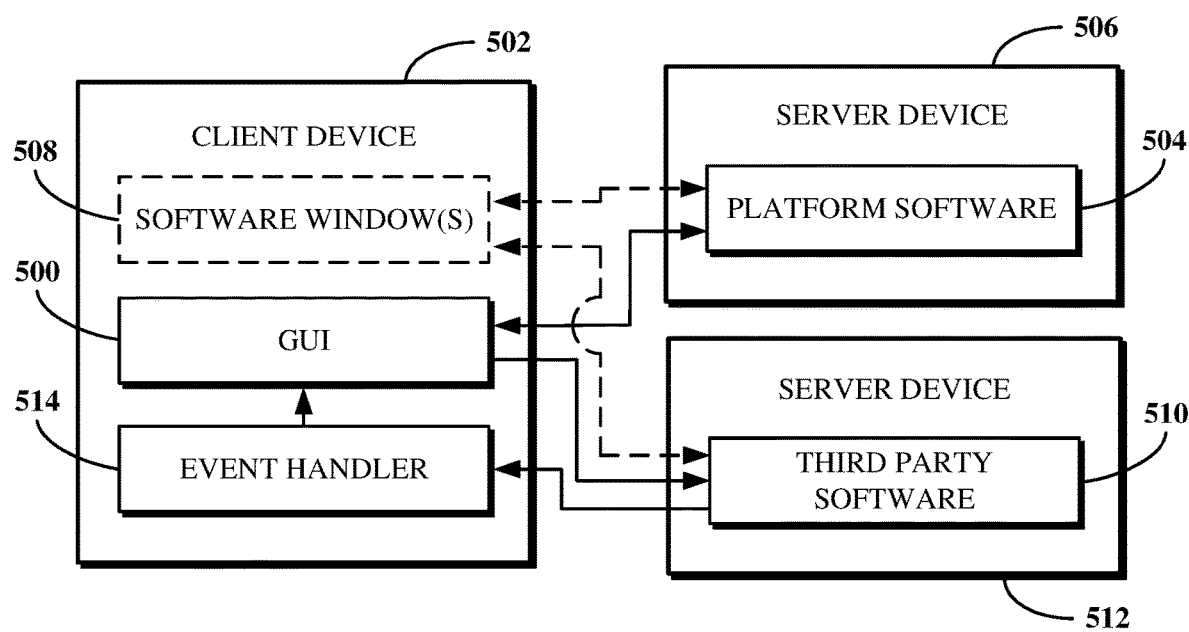
FIG. 5 is a block diagram of an example of a system which includes a GUI including a persistent panel for displaying alerts representative of real-time communications and receiving selections of response actions in response to those alerts.

FIG. 5 is a block diagram of an example of a system which includes a GUI 500 including a persistent panel for displaying alerts representative of real-time communications and receiving selections of response actions in response to those alerts. The persistent panel may, for example, be the persistent panel 400 shown in FIG. 4. The GUI 500 is displayed at a client device 502, which may, for example, be one of the client devices 304 through 310 shown in FIG. 3. For example, the client device 502 may be a desktop computer or a laptop computer. The GUI 500 is configured to persist within a foreground of a display of the client device 502.

The client device 502 accesses and thus uses platform software 504 implemented on one or more server devices, such as a server device 506. The platform software 504 is or otherwise includes software of a software platform, for example, the software platform 300 shown in FIG. 3. For example, the platform software 504 may include one or more of the software 312 through 318 shown in FIG. 3. The client device 502 may thus access and use the platform software 504 for one or more of sending and receiving calls, sending and receiving messages, joining and scheduling conferences, and the like.

In their typical use, the platform software 504 is implemented within one or more software windows 508 at the client device 502. For example, telephony software may be implemented in a first software window 508, conferencing software may be implemented in a second software window 508, and so on. However, the GUI 500 is configured to interface with the platform software 504 to deliver information associated with the platform software 504 within one or more entries of one or more groupings of the persistent panel included in the GUI 500. Thus, rather than the user of the client device 502 switching between the various software windows 508 to access the various platform software 504 features, the user of the client device 502 may access those platform software 504 features using the GUI 500.

The client device 502 may further access and thus use third party software 510 implemented by one or more server devices, such as a server device 512. The third party software 510 includes or otherwise refers to software implemented external to the software platform associated with the platform software 504. The client device 502 may access and use the third party software 510 for one or more purposes.

In their typical use, the third party software 510 may be accessed using one or more of the software windows 508. However, the GUI 500 may be configured to interface with the third party software 510 to deliver information associate with the third party software 510 within one or more entries of one or more groupings of the persistent panel included in the GUI 500. Thus, rather than the user of the client device 502 switching between the various software windows 508 to access the various third party software 510 features, the user of the client device 502 may access those third party software 510 features using the GUI 500.

The GUI 500, via the persistent panel thereof, thus may be configured to display information associated with services of the platform software 504 and services of the third party software 510. The manner by which the various respective information is pushed to the GUI 500 for display therein may depend upon whether the information is received from the platform software 504 or the third party software 510. In particular, where the GUI 500 and thus the persistent panel thereof are implemented by the software platform associated with the platform software 504, the platform software 504 is directly connected to the persistent panel using a native interface which integrates the various software platform features. In such a case, the persistent panel gets the information to display within the entries thereof directly from the platform software 504.

However, because the third party software 510 is external to the software platform which implements the GUI 500, information associated with the third party software 510 may be processed using an event handler 514 at the client device 502. For example, information associated with the third party software 510 may be sent to the event handler 514, which is configured to interface with the third party software 510 and which processes the received information to create an entry or update an entry within the persistent panel of the GUI 500, as applicable. In most cases, alerts associated with real-time communications to be displayed within entries in an alert grouping of the persistent panel within the GUI 500 (e.g., entries in the alerts grouping 402 shown in FIG. 4) will come the platform software 504, to limit or prevent delays in presenting real time alerts for actioning by the user which might otherwise introduced by the event handler 514. In some implementations, the GUI 500 may be configured to interface directly with the third party software 510.

Implementations of the system described with respect to FIG. 5 may include a first communication system, a second communication system, and a GUI system. For example, the first communication system may be hardware and/or software configured to implement a first service through which first real-time communications are received at the client device 502, such as a first service of the platform software 504. The second communication system may be hardware and/or software configured to implement a second service through which second real-time communications are received at the client device 502, such as a second service of the platform software 504. In one non-limiting example, the first service may be a telephony service (e.g., implemented using the telephony software 312 shown in FIG. 3) and the second service may be a conferencing service or a messaging service (e.g., implemented using the conferencing software 314 shown in FIG. 3 or the messaging software 316 shown in FIG. 3, respectively). The GUI system may be hardware and/or software configured to output the GUI 500 for display at the client device 502. The GUI 500 may present one or more alerts and one or more response actions for each of the one or more alerts, in which each of the one or more alerts corresponds to one of the first real-time communications or one of the second real-time communications. Using the GUI system, an action associated with the first service may be initiated responsive to a selection of a response action associated with an alert corresponding to one of the first real-time communications and an action associated with the second service is initiated responsive to a selection of a response action associated with an alert corresponding to one of the second real-time communications. The response actions may thus each be selectable by a single user interaction to initiate the action associated with the first service or the action associated with the second service.

Figure 6:
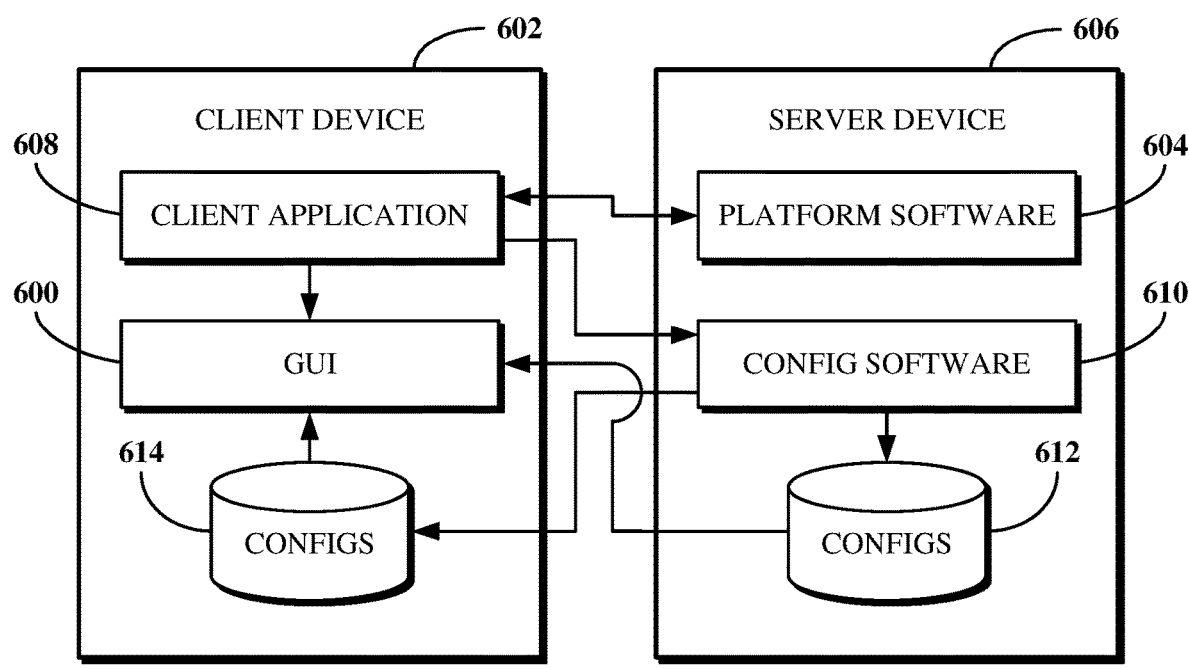
FIG. 6 is a block diagram of an example of a system which includes a GUI including a persistent panel which may be configured to change aspects of the persistent panel.

FIG. 6 is a block diagram of an example of a system which includes a GUI 600 including a persistent panel which may be configured to change aspects of the persistent panel. The GUI 600 may, for example, be the GUI 500 shown in FIG. 5. The GUI 600 is displayed at a client device 602, which may, for example, be the client device 502 shown in FIG. 5. The GUI 600 displays information associated with platform software 604 running at a server device 606, which may for example, be the platform software 504 and the server device 506 shown in FIG. 5. The GUI 600 may, for example, receive the information associated with the platform software 604 directly from the platform software 600 or indirectly, such as through a client application 608 running at the client device 602 and which enables access to the platform software 604 at the client device 602.

The user of the client device 602, such as via the client application 608, may configure one or more aspects of the GUI 600. In particular, configuration software 610 running at the server device 606 may be used to configure some or all of the persistent panel of the GUI 600, such as by configuring one or more single-click actions (e.g., the single-click actions 410 shown in FIG. 4) presented within the persistent panel for a given type of entry within the persistent panel, one or more first party or third party software integrations for use with the persistent panel, or the like. For example, the configuration software 610 may be used to configure one or more response actions for at least some alerts presented in the GUI 600. In some implementations, the platform software 604 may include the configuration software 610.

The configuration software 610 can store the configurations set using the client device 602 in a server data store 612 at the server device 606 and/or in a local data store 614 at the client device 602. The GUI 600 may then retrieve the configurations from one of those data stores. For example, the GUI 600 may first check for configurations within the local data store 614 before retrieving configurations from the server data store 612. The GUI 600 is may check the local data store 614 and/or the server data store 612 for configuration updates at discrete time intervals (e.g., once per hour). Alternatively, configurations may be pushed to the GUI 600 to update the GUI 600 in response to the configurations being stored in the local data store 614 and/or in the server data store 612.

Figure 7A:
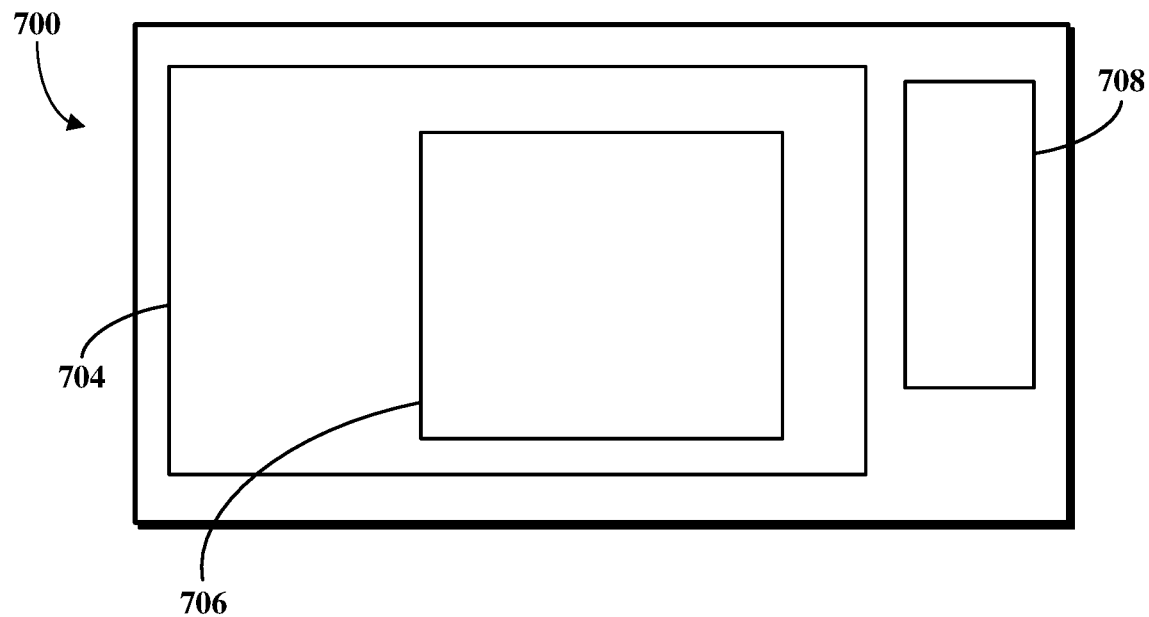
FIGS. 7A-B are illustrations of examples of displays including GUIs which may be displayed at a client device.
Figure 7B:
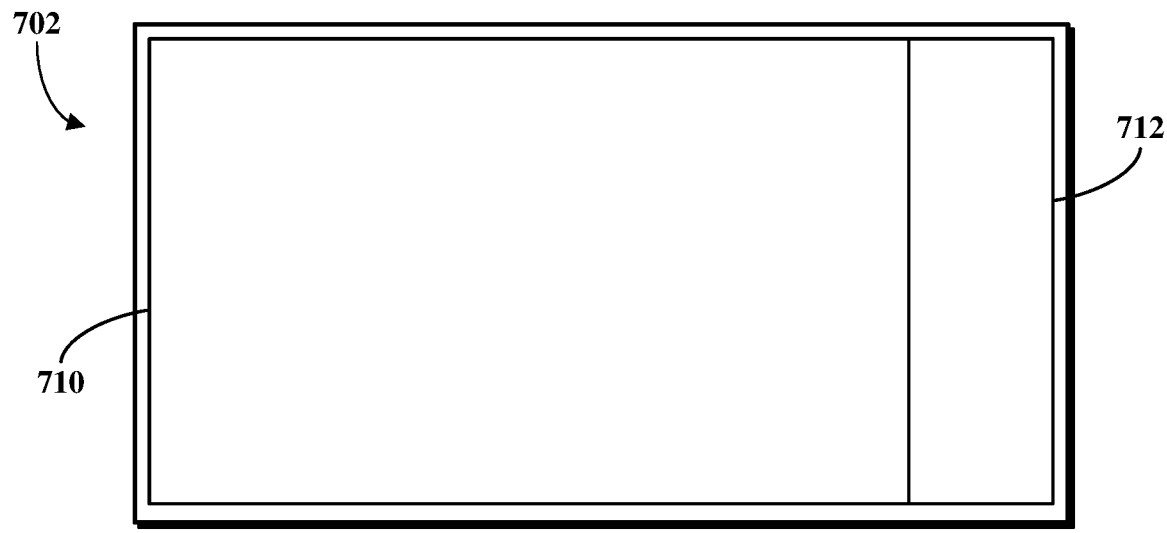

FIGS. 7A-B are illustrations of examples of displays 700 and 702 including GUIs which may be displayed at a client device, for example, the client device 502 shown in FIG. 5 or the client device 602 shown in FIG. 6. Referring first to FIG. 7A, the display 700 is shown. The display 700 includes a first GUI 704, a second GUI 706, and a persistent panel GUI 708. The first GUI 704 is a GUI of software external to a software platform (e.g., third party software, for example, the third party software 510 shown in FIG. 5). The second GUI 706 is a GUI of software of a software platform (e.g., platform software, for example, the platform software 506 shown in FIG. 5). The persistent panel GUI 708 is a GUI which includes a persistent panel, for example, the persistent panel 400 shown in FIG. 4. For example, the persistent panel GUI 708 may be the GUI 500 shown in FIG. 5 or the GUI 600 shown in FIG. 6. The persistent panel GUI 708 is configured to persist within a foreground of the display 700.

Referring next to FIG. 7B, the display 702 is shown. The display 702 includes a first GUI 710 and a persistent panel GUI 712. The first GUI 710 is a GUI of software of a software platform (e.g., platform software, for example, the platform software 506 shown in FIG. 5). In particular, the first GUI 710 represents an extended canvas version of the second GUI 706 shown in FIG. 7A. For example, the first GUI 710 may be a GUI of an attendant console of a software platform. The persistent panel GUI 712 is a GUI which includes a persistent panel, for example, the persistent panel 400 shown in FIG. 4. For example, the persistent panel GUI 712 may be the GUI 500 shown in FIG. 5 or the GUI 600 shown in FIG. 6. The persistent panel GUI 712 is configured to persist within a foreground of the display 702.

Figure 8:
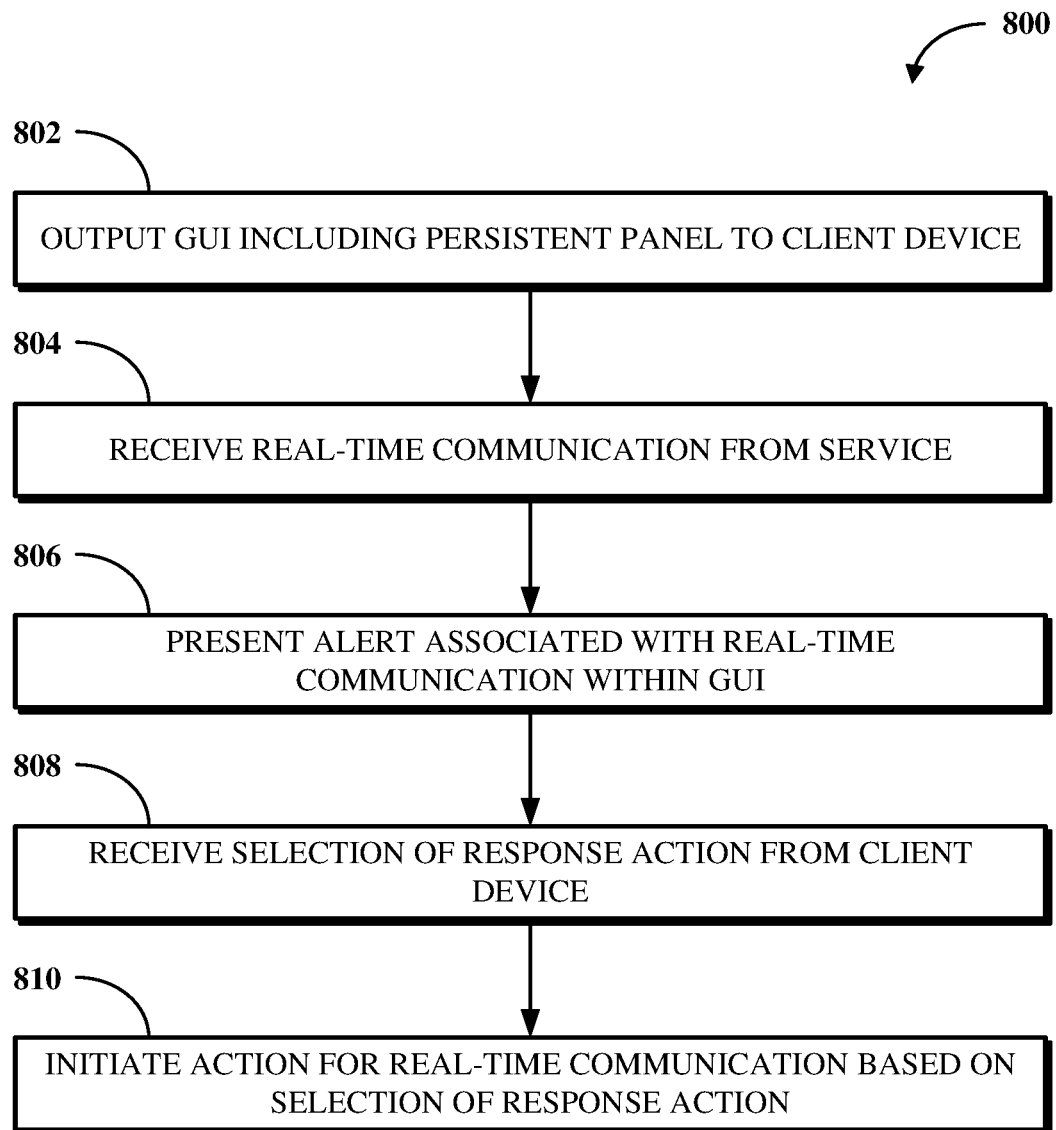
FIG. 8 is a flowchart of an example of a technique for initiating an action for a real-time communication based on a selection of a response action within a GUI.
Figure 9:
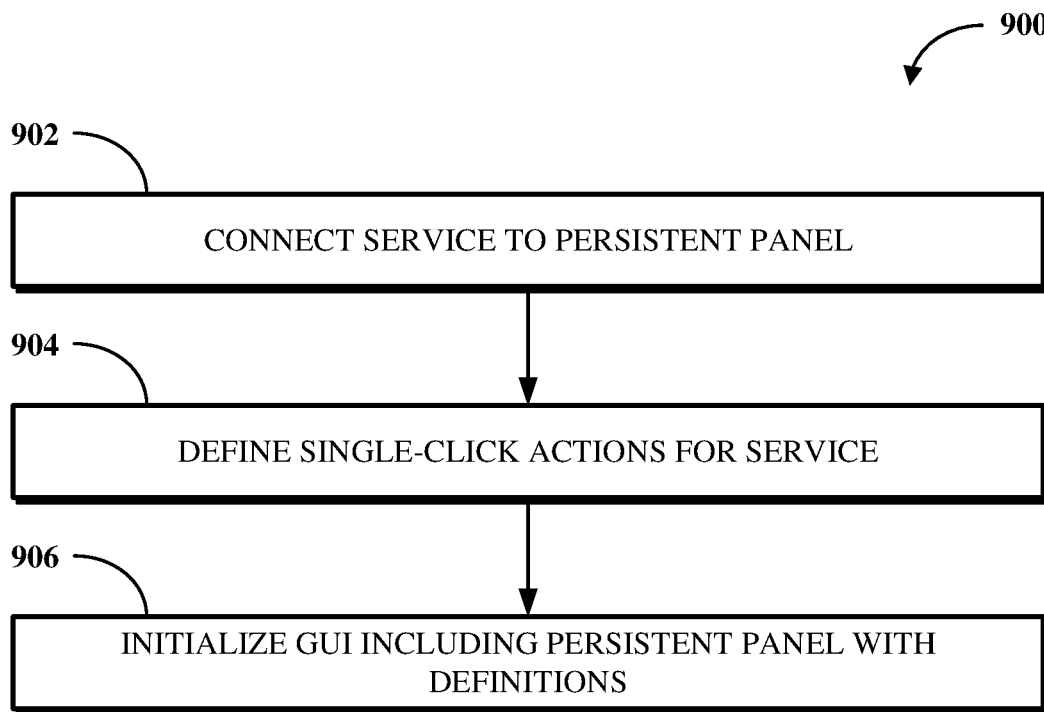
FIG. 9 is a flowchart of an example of a technique for connecting a service to a persistent panel of a GUI.
Figure 10:
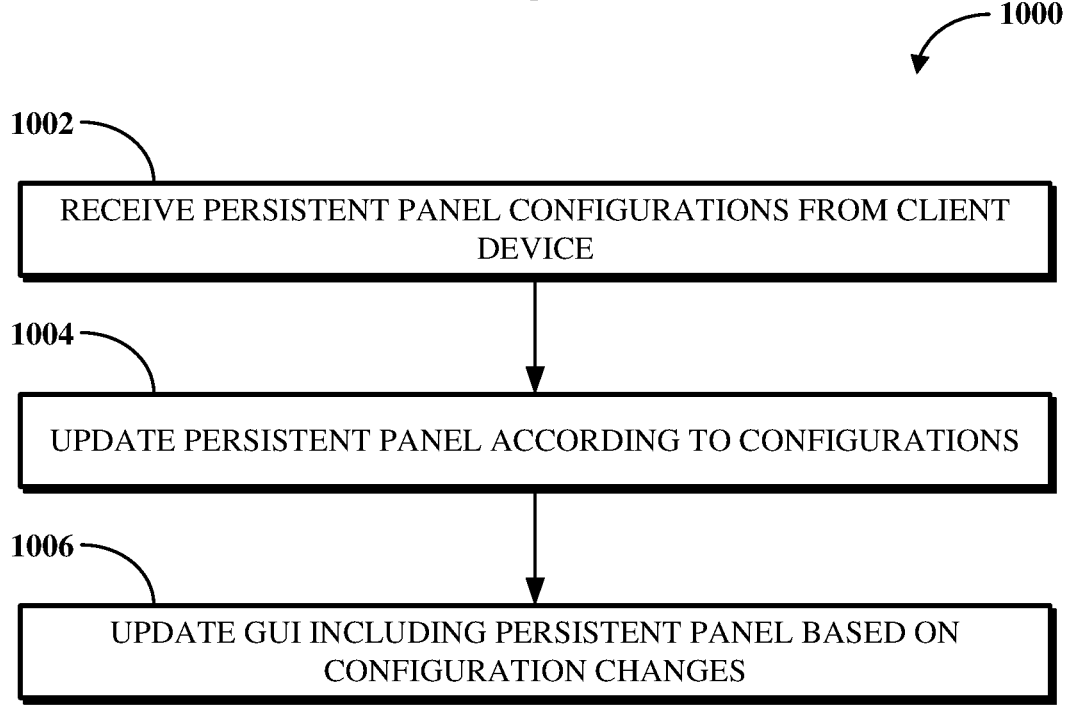
FIG. 10 is a flowchart of an example of a technique for updating a GUI according to configuration changes for a persistent panel.

To further describe some implementations in greater detail, reference is next made to examples of techniques which may be performed by or using an extensible user experience framework. FIG. 8 is a flowchart of an example of a technique 800 for initiating an action for a real-time communication based on a selection of a response action within a GUI. FIG. 9 is a flowchart of an example of a technique 900 for connecting a service to a persistent panel of a GUI. FIG. 10 is a flowchart of an example of a technique 1000 for updating a GUI according to configuration changes for a persistent panel.

The technique 800, the technique 900, and/or the technique 1000 can be executed using computing devices, such as the systems, hardware, and software described with respect to FIGS. 1-7B. The technique 800, the technique 900, and/or the technique 1000 can be performed, for example, by executing a machine-readable program or other computer-executable instructions, such as routines, instructions, programs, or other code. The steps, or operations, of the technique 800, the technique 900, and/or the technique 1000, or of another technique, method, process, or algorithm described in connection with the implementations disclosed herein can be implemented directly in hardware, firmware, software executed by hardware, circuitry, or a combination thereof.

For simplicity of explanation, the technique 800, the technique 900, and the technique 1000 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 8, a flowchart of an example of the technique 800 for initiating an action for a real-time communication based on a selection of a response action within a GUI is shown. At 802, a GUI including a persistent panel is output to a client device. The GUI is configured to persist within a foreground of a display of the client device. The GUI, via the persistent panel thereof, includes one or more groupings of entries in which each entry includes an information item aspect and one or more single-click actions. For example, the one or more groupings may include one or more of an alerts grouping, an application status grouping, and a user status grouping. In particular, in the alerts grouping, the GUI presents one or more alerts and one or more response actions for each of the one or more alerts in which each alert is presented in its own entry and the response actions for a given alert are represented by the one or more single-click actions therefor. Each of the alerts corresponds to different real-time communications received at the client device, and the response actions for a given alert are each selectable by a single user interaction with a single-click action for the entry of the given alert to initiate a different action for a real-time communication associated with the given alert. In some implementations, the GUI further presents one or more application status indicators for one or more software applications or services. In some implementations, the GUI further presents one or more user status indicators including a presence indicator for an operator of the client device.

At 804, a real-time communication is received from a service, such as platform software. For example, the real-time communication can be a call received using telephony software of a software platform, a conference received or otherwise started using conferencing software of a software platform, a message received using messaging software of a software platform, or another real-time communication. As described above, the GUI is configured to output entries representative of real-time communications such as the one received in one or more groupings thereof. The real-time communications thus correspond to modalities including one or more of calls, conferences, or messages.

At 806, an alert associated with the real-time communication is presented within the GUI. The particular type of alert and the entry with which it is presented in the GUI is based on a modality of the real-time communication. Presenting the alert includes presenting response actions, as single-click actions, within the entry of the GUI corresponding to the alert. The response actions presented are based on the particular type of the alert. In one example, when the real-time communication associated with the alert is a call, the one or more response actions corresponding to the alert include one or more of a first user interface element for accepting the call, a second user interface element for rejecting the call, or a third user interface element for placing the call on hold. In one example, when the real-time communication associated with the alert is a conference, the one or more response actions corresponding to the alert include one or more of a first user interface element for joining the conference, a second user interface element for messaging one or more participants of the conference, or a third user interface element for leaving the conference. In one example, when the real-time communication associated with the alert is a message, the one or more response actions corresponding to the alert include one or more of a first user interface element for viewing the message, a second user interface element for responding to the message, or a third user interface element for ignoring the message.

At 808, a selection of a response action is received from the client device. The selection is based on an interaction by a user of the client device within a single-click action in an entry for the real-time communication.

At 810, an action for the real-time communication associated with the alert is initiated. Initiating the action includes identifying the response action mapped to the single-click action selected by the user of the client device and transmitting instructions to an appropriate software service to cause the response action. For example, where the software service is native to the software platform, the GUI system which implements the GUI may use a direct integration to that software service to transmit instructions for a particular response action to be performed. In another example, where the software service is external to the software platform, the GUI system which implements the GUI may use an application programming interface (API) or other interface connector to transmit instructions for a particular response action to be performed.

In some implementations, the one or more response actions for a given alert are configurable. For example, the technique 800 may include configuring response actions for one or more types of alerts within the GUI using input received from the client device.

Referring next to FIG. 9, a flowchart of an example of the technique 900 for connecting a software service to a persistent panel of a GUI is shown. At 902, a software service is connected to a persistent panel. The software service may have native integration, such as where it is a software service implemented by a software platform which implements the persistent panel. Alternatively, the software service may use an API or other interface connector to connect to the software service.

At 902, single-click actions are defined for the software service. The single-click actions may be defined based on statistically-determined most frequently performed actions for the software service. For example, there may be a number of actions performable by a software service, and only one, two, or three of those may be defined as single-click actions for the software service. For example, where the software service is a telephony service, the actions which may be performed using the telephony service include answering a call, holding a call, retrieving a held call, disconnecting from a call, redirecting a call to a fixed destination, transferring a call (e.g., blind, warm, or to voicemail), parking a call at a specific line or group, opening a contact in a customer relationship management database, or the like. The most frequently performed ones of those actions, determined, for example, based on a statistical analysis over a corpus of sample data, may include answering a call, disconnecting from a call, holding a call, and transferring a call. Thus, those actions may be defined as single-click actions for the telephony service.

At 906, a GUI including the persistent panel is initialized with the definitions of the single-click actions. The definitions of the single-click actions configure the GUI to present specified single-click actions within entries based on those entries being introduced within the GUI, such as based on incoming real-time communications received at the client device, application status updates at the client device, or user status updates at the client device. Initializing the GUI includes preparing the GUI for use at the client device.

Referring finally to FIG. 10, a flowchart of an example of a technique 1000 for updating a GUI according to configuration changes for a persistent panel is shown. At 1002, configurations for a persistent panel are received from a client device. The configurations received from the client device may be initial configurations of response actions associated with various entries, such as for alerts representative of real-time communications, or updates to configurations of such response actions.

At 1004, the persistent panel is updated according to the configurations. Updating the persistent panel according to the configurations includes modifying one or more response actions according to the updates to the configurations.

At 1006, a GUI which includes the persistent panel is updated based on the updates to the configurations. In particular, the GUI is updated to cause new incoming entries within the persistent panel to have the modified response actions. For example, the modified response actions according to the updated configurations may be presented in the GUI in response to a new alert being presented in the GUI after the updates are processed.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus, comprising:
    a memory; and
    a processor configured to execute instructions stored in the memory to:
    output a graphical user interface including a persistent panel to a display of a client device, wherein the persistent panel includes multiple entries each corresponding to different real-time communications received at the client device, wherein each of the entries displays information associated with a real-time communication and includes one or more response actions that are each selectable by a single-click user interaction within the persistent panel to initiate a different action for a real-time communication, and wherein the persistent panel persists at a top of a foreground of the display to enable a user of the client device to view the entries and to select between response actions associated with the entries while one or more other software graphical user interfaces are output for viewing within the foreground at the display; and
    initiate an action for the real-time communication associated with a given entry of the entries based on a selection of a response action of the one or more response actions for the given entry.

2. The apparatus of claim 1, wherein the one or more response actions for the given entry correspond to the real-time communication associated with the given entry, and wherein the one or more response actions for the given entry are configurable.

3. The apparatus of claim 2, wherein the processor is further configured to execute the instructions to:
    receive updates to a configuration of response actions associated with the real-time communication; and
    modify the one or more response actions according to the updates,
    wherein the modified one or more response actions are presented in the persistent panel for the given entry.

4. The apparatus of claim 1, wherein the client device is a desktop computer or a laptop computer, and wherein the single-click user interaction is a single click using a mouse or other peripheral of the desktop computer.

5. The apparatus of claim 1, wherein the persistent panel further presents one or more application status indicators for one or more software applications or services.

6. The apparatus of claim 1, wherein the persistent panel further presents one or more user status indicators including a presence indicator for an operator of the client device.

7. The apparatus of claim 1, wherein the real-time communications correspond to modalities including one or more of calls, conferences, or messages.

8. The apparatus of claim 7, wherein, when the real-time communication associated with the given entry is a call, the one or more response actions corresponding to the given entry include one or more of a first user interface element for accepting the call, a second user interface element for rejecting the call, or a third user interface element for placing the call on hold.

9. The apparatus of claim 7, wherein, when the real-time communication associated with the given entry is a conference, the one or more response actions corresponding to the given entry include one or more of a first user interface element for joining the conference, a second user interface element for messaging one or more participants of the conference, or a third user interface element for leaving the conference.

10. The apparatus of claim 7, wherein, when the real-time communication associated with the given entry is a message, the one or more response actions corresponding to the given entry include one or more of a first user interface element for viewing the message, a second user interface element for responding to the message, or a third user interface element for ignoring the message.

11. The apparatus of claim 1, wherein at least some of the real-time communications are implemented using one or more software services of a unified communications as a service platform.

12. A non-transitory computer readable storage device including program instructions that, when executed by a processor of a client device, cause the processor to perform operations, the operations comprising:
    outputting a graphical user interface including a persistent panel to a display of a client device, wherein the persistent panel includes multiple entries each corresponding to different real-time communications received at the client device, wherein each of the entries displays information associated with a real-time communication and includes one or more response actions that are each selectable by a single-click user interaction within the persistent panel to initiate a different action for a real-time communication, and wherein the persistent panel persists at a top of a foreground of the display to enable a user of the client device to view the entries and to select between response actions associated with the entries while one or more other software graphical user interfaces are output for viewing within the foreground at the display; and
    initiating an action for the real-time communication associated with a given entry of the entries based on a selection of a response action of the response actions for the given entry.

13. The non-transitory computer readable storage device of claim 12, wherein the one or more response actions for the given entry correspond to the real-time communication associated with the given entry, and wherein the one or more response actions for the given entry are configurable.

14. The non-transitory computer readable storage device of claim 12, wherein the persistent panel further presents one or more application status indicators for one or more software applications or services.

15. The non-transitory computer readable storage device of claim 12, wherein the persistent panel further presents one or more user status indicators including a presence indicator for an operator of the client device.

16. The non-transitory computer readable storage device of claim 12, wherein the real-time communication is implemented using a software service of a unified communications as a service platform.

17. A system, comprising:
    a first communication system configured to implement a first service through which first real-time communications are received at a client device;

a second communication system configured to implement a second service through which second real-time communications are received at the client device; and a graphical user interface system configured to output a graphical user interface including a persistent panel to a display of the client device, wherein the persistent panel includes multiple entries each corresponding to one of the first real-time communications or one of the second real-time communications and includes one or more response actions that are each selectable by a single-click user interaction with the persistent panel to initiate a different action for a corresponding real-time communication, and wherein the persistent panel persists at a top of a foreground of the display to enable a user of the client device to view the entries and to select between response actions associated with the entries while one or more other software graphical user interfaces are output for viewing within the foreground at the display, wherein an action associated with the first service is initiated based on a selection of a response action associated with a first entry of the entries corresponding to one of the first real-time communications and an action associated with the second service is initiated based on a selection of a response action associated with a second entry of the entries corresponding to one of the second real-time communications.

18. The system of claim 17, wherein the persistent panel further presents one or more application status indicators for one or more software applications or services and one or more user status indicators including a presence indicator for an operator of the client device.

19. The system of claim 17, wherein the one or more response actions for at least some of the entries are configurable.

20. The system of claim 17, wherein at least one of the first service or the second service corresponds to a software service of a unified communications as a service platform.

* * * * *